Patented Aug. 21, 1934

1,971,243

UNITED STATES PATENT OFFICE 1,971,243

LUBRICATING OIL

John F. Werder, Lakewood, Ohio, assignor of one-half to Edmund Rogers, South Euclid, Ohio No Drawing. Application May 31, 1932, Serial No. 614,626

4 Claims. (Cl. 87—9)

This invention relates to an improved form of lubricant and the process of making the same.

As is well known to those familiar with the art, the efficiency and life of an automobile engine, as well as other engines and machines, is determined very largely by the factor of lubrication which, of course, in turn depends to a great extent upon the wear-resisting quality of the lubricant employed.

Theoretically, the wear-resisting quality of a lubricant depends upon the property which the lubricant possesses of adhering to the individual surfaces which are subjected to frictional stress. That is, assuming that these surfaces are covered with a film of the lubricant, the efficiency of such lubricant will be determined by the extent to which it will adhere to the surfaces and thereby resist the frictional stress which would tend to break down such protective film.

It is also a well known fact that regular lubricants which have been in use by the public for a long time, have not proved wholly satisfactory from the standpoint of resistance to wear and some attempts have been made to improve this quality of the lubricant.

One compound which has heretofore been devised for the purpose of improving the wear-resisting quality of lubricants consists in the combination of sulphur and fish oil in mineral oil. Another such attempt in this direction consisted in adding carbon tetrachloride to mineral oil. Both of these, however, have proved objectionable for different reasons and, moreover, they do not possess the advantageous features of the present invention, as will be hereinafter explained.

In the first place, the compound as disclosed in the present application, may be mixed at a considerably lower temperature than that required in the case of sulphur and fish oil above referred to. The prior form of compound just mentioned requires a mixing temperature of approximately three hundred degrees (300°) Fahrenheit, which, as will appear, is considerably higher than that required in the present case.

As compared with the other prior compound, namely, carbon tetrachloride in mineral oil, the form of compound presented in the present application is considerably less expensive to make, is of a decidedly more stable nature, and is substantially non-corroding. For the three particular reasons just mentioned, the use of tetrachloride is decidedly objectionable and impractical.

The object therefore of the present invention is to devise a compound or base which may be mixed with a mineral or any other form of oil or grease for lubricating purposes and which has certain desirable qualities not possessed by any other form of lubricant known at the present time.

More specifically, it is intended to produce a form of lubricant which is adapted to withstand a much greater degree of wear than any other form of known lubricant and to produce a lubricant which is of a more stable nature, which can be mixed at a comparatively lower temperature, is less expensive to manufacture than the other forms of attempted lubricants heretofore mentioned, and is also non-corroding.

Generally speaking, my improved form of lubricant comprises the combination of a vegetable or animal base and a halide of sulphur as for example ($S_2Cl_2$), sulphurous chloride, this being mixed with a regular mineral oil or grease of the desired consistency.

In carrying out the process of manufacturing this improved form of lubricant, there may be employed any one of several vegetable or animal bases, including the oils from cottonseed, fish, corn, lard, or linseed, there being employed approximately ninety per cent (90%), by volume, of one of these bases with which there is mixed the remaining approximate ten per cent (10%) of the halide of sulphur mentioned. These ingredients are mixed in cold condition, that is, from fifty (50) to sixty (60) degrees Fahrenheit for approximately one hour and are then heated for about six hours to a temperature of approximately one hundred and fifty (150) degrees Fahrenheit. Such heating will ensure against any danger of corrosion of the metal to which the lubricant is applied. During this process, hydrochloric acid fumes will pass off and there will result a sticky form of substance which will then be added to the regular form of mineral oil or grease in such proportion that this compound will comprise about six per cent (6%) of the resulting compound. This final compound is then ready to be added as a base to any motor oil or grease of the desired consistency in the proportion of approximately twenty-five per cent (25%) of the compound and seventy-five per cent (75%) of the motor oil or grease.

This resulting form of lubricant may be employed at any and all points throughout any type of engine or machine structure, either in the form of an oil or a grease, and may be applied in the same manner as heretofore in the lubrication of machine structures.

From actual tests, it has been found that my present improved form of lubricant possesses greater wear-resisting properties than any other form of lubricant known at the present time. This means that the life of the parts of the engine or machine structure is prolonged and there is thus realized a decided saving in the cost of replacing such parts and there is realized also a decidedly increased efficiency in the operation of the engine. My new lubricant contains nothing that is injurious to the machine parts and it possesses the other several advantages above mentioned.

It is to be understood that the present disclosure is merely for the purpose of illustration and that the ingredients as well as their relative proportions may be varied without departing from the spirit of my invention. Any and all such modifications are intended to be comprehended by the following claims.

What I claim is:

1. A lubricant consisting of approximately seventy-five (75) per cent of a motor oil or grease and approximately twenty-five (25) per cent of a compound comprising approximately six (6) per cent of a sub-compound in mineral oil or grease, said sub-compound consisting of approximately ninety (90) per cent of a vegetable or animal base and approximately ten (10) per cent of chloride of sulphur.

2. A lubricant consisting of approximately seventy-five (75) per cent of a motor oil or grease and approximately twenty-five (25) per cent of a compound comprising approximately six (6) per cent of a sub-compound in mineral oil or grease, said sub-compound consisting of approximately ninety (90) per cent of a vegetable or animal base and approximately ten (10) per cent of chloride of sulphur.

3. The process of making a lubricating compound for use in motor oil or grease, consisting in mixing at approximately fifty (50) degrees Fahrenheit approximately ten (10) per cent of chloride of sulphur and ninety (90) per cent of a vegetable or animal base, then heating the same to approximately one hundred and fifty (150) degrees Fahrenheit, then combining the resulting compound with a mineral oil or grease so as to form a further compound of which the first compound forms approximately six (6) per cent, and finally adding the resulting compound to a motor oil or grease at the approximate ratio of twenty-five (25) per cent of the compound and seventy-five (75) per cent of the motor oil or grease.

4. The process of making a lubricating compound for use in motor oil or grease, consisting in mixing approximately ten (10) per cent of chloride of sulphur and ninety (90) per cent of a vegetable or animal base so as to form a sub-compound, then combining the sub-compound with a mineral oil or grease so as to form a primary compound of which the sub-compound forms approximately six (6) per cent, and finally adding the primary compound to a motor oil or grease at the approximate ratio of twenty-five (25) per cent of the compound and seventy-five (75) per cent of the motor oil or grease.

JOHN F. WERDER.